US011919187B2

(12) United States Patent
Flükiger

(10) Patent No.: US 11,919,187 B2
(45) Date of Patent: Mar. 5, 2024

(54) APPARATUS AND METHOD FOR PRODUCING A CUTTING GEOMETRY IN A CLOSURE CAP FOR A CONTAINER

(71) Applicant: PackSys Global AG, Burgdorf (CH)

(72) Inventor: Paul Flükiger, Heimberg (CH)

(73) Assignee: PackSys Global AG, Burgdorf (CH)

( * ) Notice: Subject to any disclaimer, the term of this patent is extended or adjusted under 35 U.S.C. 154(b) by 0 days.

(21) Appl. No.: 17/780,481

(22) PCT Filed: Nov. 5, 2020

(86) PCT No.: PCT/EP2020/081151
§ 371 (c)(1),
(2) Date: May 26, 2022

(87) PCT Pub. No.: WO2021/110350
PCT Pub. Date: Jun. 10, 2021

(65) Prior Publication Data
US 2023/0001596 A1 Jan. 5, 2023

(30) Foreign Application Priority Data
Dec. 5, 2019 (EP) .................................... 19213894

(51) Int. Cl.
*B26D 3/08* (2006.01)
*B26D 7/01* (2006.01)
*B26F 1/00* (2006.01)

(52) U.S. Cl.
CPC ................. *B26D 3/08* (2013.01); *B26D 7/01* (2013.01); *B26F 1/0023* (2013.01); *B26F 1/0038* (2013.01); *B26F 2210/04* (2013.01)

(58) Field of Classification Search
CPC . B26D 3/08; B26D 7/01; B26F 1/0023; B26F 1/0038; B26F 2210/04
(Continued)

(56) References Cited

U.S. PATENT DOCUMENTS 4,021,285 A * 5/1977 Amberg .................. B67B 5/036 425/388
5,522,293 A * 6/1996 Ingram ................ B26D 7/2628 82/47

(Continued)

FOREIGN PATENT DOCUMENTS

DE 9314485 U1 12/1993
EP 0521389 A1 1/1993

(Continued)

OTHER PUBLICATIONS

European Patent Office, Extended European Search Report, EP Application No. 19213894.9, dated May 19, 2020, 7 pages.

(Continued)

*Primary Examiner* — Omar Flores Sanchez
(74) *Attorney, Agent, or Firm* — Mahamedi IP Law LLP

(57) ABSTRACT

The invention relates to a method for producing a cutting geometry running in the circumferential direction, in particular for producing a locking ring, in a shell of a closure cap for a container, comprising the steps of providing the closure cap and transporting the closure cap by means of a transport device along a transport path. The closure cap is fed to a machining section of the transport path, in which machining section a stationary cutter having a cutting blade extending along a cutting section is arranged, and a cutting process is carried out in the machining section by rolling of the shell on the cutting blade of the stationary cutter to produce the cutting geometry. The closure cap is fed to the machining section with a predeterminable orientation of a rotational position relative to a centre axis of the closure cap, and a driver of the transport device which rotates about an axis of rotation is made to engage with a stop of the closure cap and a movement of the rotating driver is controlled in such a way that, when the closure cap enters the machining section, the driver has a rotated position corresponding to the (Continued)

predeterminable orientation of the closure cap. The invention further relates to an apparatus for carrying out the method.

20 Claims, 6 Drawing Sheets

(58) Field of Classification Search
USPC ............................................................ 83/880
See application file for complete search history.

(56) References Cited

U.S. PATENT DOCUMENTS

| | | | | | |
|---|---|---|---|---|---|
| 5,557,999 | A * | 9/1996 | Smith | B26D 7/01 83/418 |
| 5,660,289 | A * | 8/1997 | Spatz | B26D 7/01 215/252 |
| 6,826,994 | B1 * | 12/2004 | Liao | B29C 59/007 425/291 |
| 2007/0089587 | A1 * | 4/2007 | Liao | B26F 1/18 83/879 |
| 2016/0354946 | A1 * | 12/2016 | Sain | B26D 7/06 |
| 2021/0121019 | A1 * | 4/2021 | Folmann | A24B 7/06 |
| 2022/0168917 | A1 * | 6/2022 | Venturini | B26D 7/06 |

FOREIGN PATENT DOCUMENTS

| | | | |
|---|---|---|---|
| EP | 0667216 | A1 | 8/1995 |
| EP | 3103603 | B1 | 10/2017 |

OTHER PUBLICATIONS

European Patent Office, PCT International Search Report and Written Opinion, Application No. PCT/EP2020/081151, dated Jan. 29, 2021, 13 pages.

* cited by examiner

APPARATUS AND METHOD FOR PRODUCING A CUTTING GEOMETRY IN A CLOSURE CAP FOR A CONTAINER

TECHNICAL FIELD

The invention relates to a method for producing a cutting geometry running in the circumferential direction, in particular for producing a locking ring, in a shell of a closure cap for a container. The invention furthermore relates to an apparatus for carrying out such a method.

PRIOR ART

In order to ensure for users when buying a container such as, for example, a beverage bottle, that the container is still in the original state and has not been previously deliberately or inadvertently opened, closure caps for containers of this type are in most instances provided with a locking ring. This locking ring is connected to a main part of the closure cap that fulfills the closure function by way of a predetermined breaking point such that the predetermined breaking point is inevitably damaged when the container is opened and the initial opening of the container can thus be reliably identified from the outside. In order to guarantee this securing function, the locking ring when extracting or unscrewing the cap part is held on the container at least until the predetermined breaking point breaks. To this end, the container in an extraction direction on a neck on which the closure cap sits usually has an undercut, for example in the shape of a bead, the locking ring engaging behind the latter from below, i.e. counter to an opening direction. As a result thereof, when the closure cap is being removed, the locking ring resists extraction on the bead of the container such that the predetermined breaking point is torn open. For this purpose, an encircling, occasionally interrupted, beading which is folded inward is typically configured on the locking ring, the locking ring engaging on the bead on the container from the rear by way of said beading. It is also known for a thickened portion instead of a beading to be provided on the inside of the locking ring.

In order to prevent the main part being able to be separated upon removal from the container, the predetermined breaking point can be configured in such a manner that a connection between the main part and the locking ring remains upon removal ("tethered cap"). This is advantageous with a view to ecological sustainability, in particular with a view to reducing plastic waste which is disposed of in an uncontrolled manner, for example.

Locking rings of this type are typically generated by cutting a cutting geometry into a closure cap. The cutting geometry corresponds to one or a plurality of predetermined breaking points. To this end, the closure caps can be guided past a cutting knife and rolled on the latter so as to generate the predetermined breaking point, for example in the form of a partially interrupted slot in the shell of the closure cap. In many applications the orientation in which the closure caps are fed to the cutting blade in terms of the rotary position of said closure caps in terms of the central axis thereof is irrelevant.

However, in the case of closure caps which are not completely rotationally symmetrical it is often desirable or necessary, respectively, for the cut to be generated according to a predefinable orientation of the closure cap. This may be the case, for example, when a printed image to be applied is to be aligned with elements of the closure cap that are not rotationally symmetrical. Elements of this type may comprise, for example, a not rotationally symmetrical locking ring (guarantee seal) generated in the course of the cutting procedure, or a securing strap of the closure cap. In the case of closure caps having a lid which is able to be flipped open by way of a hinge, said lid being secured on the main body by webs until initially opened, it is likewise essential that the hinge is not destroyed in the cutting procedure ("flip top" assembly). In some cases, clearances for the hinge may even be required in the cutting geometry of the slot here. Moreover, asymmetrically configured material thickenings in which the locking ring is not to be separated from the lid may also be present, a cutting geometry thus having to be correspondingly aligned.

It is known from EP 3 103 603 B1 (Bortolin Kemo S.P.A.) to optically detect an orientation of the rotary position of a closure cap held in a chuck prior to producing the cut and to adjust the desired orientation of the rotary position by way of a controlled drive of the chuck. However, a method of this type is complex in terms of control technology and cost intensive. Moreover, the measuring and aligning of the closure cap are time-consuming, this limiting the speed of the method and thus the potential throughput.

DESCRIPTION OF THE INVENTION

It is an object of the invention to achieve a method and an apparatus for producing a cutting geometry running in the circumferential direction, in particular for producing a locking ring, in a shell of a closure cap for a container, said method and apparatus being associated with the technical field mentioned at the outset and overcoming the disadvantages of the prior art. It is in particular an object of the invention to achieve a method and an apparatus for producing the cutting geometry running in the circumferential direction in the shell of the closure cap for the container that are reliable and economical in terms of investment and operation.

The achievement of the object is defined by a method according to the features of independent claim 1 and by an apparatus according to the features of independent claim 11. Variants of the invention are defined in the dependent claims.

According to the invention, the method for producing a cutting geometry running in the circumferential direction, in particular for producing a locking ring, in a shell of a closure cap for a container comprises the following steps:

a) providing the closure cap;
b) transporting the closure cap along a transport path by a transport installation; wherein
c) the closure cap is fed to a machining section of the transport path, in which machining section a stationary cutting knife having a cutting blade that extends along a cutting section is disposed; and
d) a cutting procedure for generating the cutting geometry in the machining section is carried out by rolling the shell on the cutting blade of the stationary cutting knife.

The providing of the closure cap can take place in a plurality of known ways. For example, the closure cap can be provided from a reservoir of a singularization apparatus such as, for example, a disk screen or a carousel. The transport installation acquires the closure caps provided in a singularized manner and transports the latter along the transport path. A multiplicity of possibilities pertaining to how the transport installation can acquire the closure cap are known to the person skilled in the art. For example, it is conceivable for the closure cap to be received in a receptacle that is movable along the transport path, or in a chuck that is movable along the transport path and which externally encompasses the closure cap. In other embodiments, the transport installation can comprise a support mandrel which engages in an interior of the closure cap and thus transports the closure cap along the transport path.

The transport path that is passed through by the closure cap in the course of the method according to the invention defines at least one portion of a process path. The transport path presently comprises at least the machining section in which machining of the closure cap takes place, i.e. in which a state of the closure cap is modified. In principle, the machining section can comprise a plurality of machining stations such as, for example, a cutting knife for generating a cutting geometry in the shell of the closure cap, a printing station for printing the closure cap and/or a folding apparatus which folds a shell portion of the closure cap so as to generate a locking ring. According to the invention, the machining section comprises at least one cutting section along which the cutting blade or a plurality of cutting blades of the cutting knife extends/extend. The cutting section forms at least one part of the machining section but can in particular also correspond to the entire machining section. Each cutting blade protrudes into the transport path of the closure cap in such a manner that a cutting edge, or a plurality of cutting edges, respectively, of the cutting blade generates/generate one or a plurality of cuts in the shell of the closure cap when the latter is transported along the cutting section by the transport installation. In the cutting section, the closure cap is preferably offered up to the cutting blade by the transport installation.

For feeding the closure cap to the machining section, the transport path can comprise an infeed section which in the direction of the process lies ahead of the machining section and preferably directly adjoins the latter. The infeed section typically serves only for feeding the closure cap to the machining section, i.e. no machining of the closure cap takes place on this portion of the transport path. The closure cap, while being transported along the infeed section, can be moved to a position desired for the later machining, in particular to the predefinable orientation of the rotary position in terms of the central axis, for example. However, an infeed section is not mandatory and the closure cap can be acquired, for example, in a singularization apparatus and fed directly to the machining section. In this case, the predefinable orientation of the rotary position of the closure cap in terms of the central axis thereof when feeding can already be established in the course of the acquisition of the closure cap, for example.

The transport path by way of the profile of the latter in the region of the cutting section defines a transport plane. The cutting blade of the cutting knife here extends so as to be substantially parallel to the transport plane. The entire machining section, as well as optionally the infeed section, can lie in the transport plane.

According to the invention, the feeding of the closure cap to the machining section takes place at a predefinable orientation of a rotary position in terms of a central axis of the closure cap. The central axis corresponds to an axis of rotational symmetry of the closure cap, wherein the closure cap does not have to be configured so as to be strictly rotationally symmetrical and the central axis defines an axis of primary symmetry of the basic shape of the closure cap. In the present context, the closure cap can therefore also have elements which are not configured in a rotationally symmetrical manner, such as a not rotationally symmetrical cutting geometry, an internal thread and/or a lid fastened by way of a hinge on one side.

According to the invention, it is thus achieved that machining of the closure cap in the machining section can take place so as to proceed from a predefinable rotary position. This is particularly advantageous in particular in the case of not completely rotationally symmetrical closure caps in which a printed image to be applied to elements of the closure cap has to be aligned, for example. Elements of this type comprise, for example, a not rotationally symmetrical locking ring (guarantee seal) generated in the course of the cutting procedure, or a securing strap of the closure cap. In the case of closure caps having a lid which is able to be flipped open by way of a hinge ("flip top" assembly) and which until initially opened is secured on the main body by webs, it is likewise essential that the hinge is not destroyed in the cutting procedure. If necessary, clearances for the hinge are required here in the cutting geometry of the slot, oriented feeding of the closure cap thus being mandatory. Moreover, asymmetrically configured material thickenings in which the locking ring is not to be separated from the lid ("tethered caps") and a cutting geometry has to be correspondingly aligned may also be present.

According to the invention, the feeding of the closure cap to the machining section at a predefinable orientation of a rotary position in terms of a central axis of the closure cap is achieved in that a driver of the transport installation that rotates about a rotation axis is brought to engage with a detent of the closure cap during feeding. A movement of the rotating driver here is controlled in such a manner that, when the closure cap enters the machining section, the driver has a rotary position that corresponds to the predefinable orientation of the closure cap.

The rotating driver is preferably brought to engage with the detent of the closure cap by way of a rotating movement about the rotation axis of said rotating driver. The engagement permits that the rotating movement of the rotating driver causes a corresponding rotation of the closure cap about the central axis of the latter. The orientation of the rotary position of the closure cap in terms of the rotating driver, i.e. a relative rotary position between the driver and the closure cap, is thus defined by way of the engagement between the detent and the driver.

The engagement preferably takes place by way of a form-fit of the driver and the detent. To this end, the driver and the detent are configured so as to be mutually complementary and mutually aligned such that said driver and said detent can be brought to engage. "Engagement" here may describe that the driver on one side simply bears on the detent, but may also refer to the interaction of more complex shapes such as, for example, an undercut of the detent being engaged from the rear by a correspondingly configured driver. The detent as well as the driver can thus be configured as simple cams, for example, which for engagement can be brought to impact on one another. However, more complex shapes of detents and drivers that enable the desired interaction are also conceivable. Of course, more than one driver may be present and/or there may be more than one detent on the closure cap, depending on the requirement.

In that according to the invention the rotating driver of the transport installation during feeding is brought to engage with the detent of the closure cap, and the rotating driver according to the invention is controlled in such a manner that, when the closure cap enters the machining section, said driver has the rotary position that corresponds to the predefinable orientation of the closure cap, the closure cap which, in terms of the rotary movement by way of the engagement is coupled to the driver, at this location has the predefinable orientation in terms of the rotary position of said closure cap.

The method according to the invention permits in particular that a closure cap provided in an arbitrary rotary position can be reliably fed to the machining section at a predefinable orientation. In particular, a complex and thus time-consuming adjustment using optical inspection and corresponding adapting of the rotary position of the closure cap, as is known from the prior art, is not required here.

The central axis of the closure cap, at least in the machining section, or optionally also in the infeed section, is preferably perpendicular to the transport plane. Likewise, the rotation axis of the rotating driver is also advantageously disposed so as to be perpendicular to the transport plane.

In order to ensure that the closure cap during feeding is entrained by the rotating driver by way of the detent, the movement of the rotating driver is preferably controlled in such a manner that the rotating driver and the detent of the closure cap come to positively engage in the context of a complete relative revolution between the closure cap and the driver during feeding. In this case, the rotation of the driver at an arbitrary initial orientation of the rotary position of the closure cap "overtakes" any potential spontaneous or previously introduced rotation such that the driver and the detent can be brought to engage in any case. Alternatively, the closure cap can already be provided with a specific orientation, or with a specific range of orientation, respectively, such that, proceeding from an initial rotary position of the driver, no complete relative revolution is required for a reliable engagement of the detent and the driver.

In a further rotation of the rotating driver, the engagement is preferably maintained at least until entering the machining section.

In one preferred embodiment, the rotating movement of the rotating driver about the rotation axis thereof is controlled in such a manner that a rotating speed during feeding corresponds to a rotating speed in the region of the machining section. In other words, the rotating driver rotates at a constant rotating speed when passing through the transport path. This has the advantage that controlling of the rotating movement of the rotating driver can take place in a particularly simple manner. The rotating speed here is preferably chosen in such a manner that an engagement of the driver and the detent can take place during feeding, i.e. the rotating speed of the driver is higher than a rotation of the closure cap about the central axis of the latter.

The rotating speed of the closure cap in the machining section can be increased in such a manner that said closure cap rotates faster than the driver. The engagement can thus be released as a result of the lower rotating speed of the driver. The rotating speed of the closure cap here can be controlled by, for example, passive control means such as a contact face on which the closure cap rolls or, for example, by active control means such as a controlled rotation of a chuck in which the closure cap is held during transport. In principle, the cutting resistance when rolling in the cutting section can already be adequate in order to ensure a corresponding rotation of the closure cap.

In other words, the rotating driver can rotate at a constant rotating speed, and the engagement, or the release of the engagement, respectively, can be achieved by controlling the rotation of the closure cap.

Conversely, the engagement, or the release of the engagement, respectively, can also be achieved by controlling the rotating speed of the rotating driver. In another embodiment, the rotating movement of the rotating driver about the rotation axis thereof is therefore controlled in such a manner that a first rotating speed during feeding is higher than a second rotating speed in the region of the machining section, in particular while rolling in the cutting procedure. It is thus achieved that an engagement of the driver and the detent can reliably take place during feeding, on the one hand, and the engagement in the machining section, in which a rotation of the closure cap may be determined by other means, can be released as a result of the lower rotating speed such that the rotating driver does not interfere or collide, respectively, with the detent, on the other hand. In particular, a transition into the machining section can be better controlled by controlling the rotating speeds. For example, a jump in the speed when entering the machining section can be avoided by a targeted, and optionally continuous, controlling of the rotating speed of the driver in the infeed section.

It is understood that the rotating speed of the closure cap can also be controlled during feeding in that passive control means such as a contact face can be present in an infeed section of the transport path, for example, the closure cap interacting with said contact face, for example rolling or rolling in a sliding manner on the latter, in such a manner that a rotation about the central axis of said closure cap is generated. The rotation can likewise be achieved by active control means, for example by a controlled rotation of a chuck in which the closure cap is held during transport.

A rotation of the closure cap about the central axis thereof in the machining section is preferably controlled in such a manner that the closure cap is set in a predefinable rotation about the central axis thereof, said rotation in particular being largely independent of the rotating movement of the rotating driver. This preferably takes place in that the shell of the closure cap is rolled on a contact face. The contact face can be configured in portions but preferably extends across the entire machining section so as to ensure an unequivocally determined rotary position of the closure cap at each location. Therefore, the contact face advantageously interacts with an external side of the shell in such a manner that slippage is prevented. This can be achieved, for example, by way of a form-fit and/or a friction-fit between the shell and the contact face. To this end, the contact face can have a surface structure which is suitable for this purpose and which increases the friction in relation to the shell or in which complementary surface structures of an external side of the shell can engage, for example.

The rotating movement of the rotating driver and/or of the closure cap upon entering the machining section is preferably controlled in such a manner that an angular speed of the rotating driver about the rotation axis thereof differs from an angular speed of the closure cap about the central axis of the latter by in particular at most 20%. Preferably, the angular speed of the driver here is lower than the angular speed of the closure cap. The engagement between the rotating driver and the detent of the closure cap can be released as a result of the lower angular speed of the driver.

As a result of the upper limit it can be prevented, in particular during the cutting procedure, that the faster rotating detent of the closure cap is offered up to the slower rotating driver, i.e. catches up or overtakes the latter, respectively. The cutting procedure typically does not require more than 1 to 2 complete revolutions of the closure cap such that a collision with the driver can be prevented in a sufficiently reliable manner by way of the stated upper limit of at most 20%.

In order to ensure the engagement of the driver and the detent when feeding, or in order to reduce or eliminate any potential spontaneous or previously introduced rotation of the closure cap, in one preferred embodiment a rotating movement of the closure cap about the central axis thereof during feeding is impeded. The impediment is performed in particular before an engagement between the driver and the detent takes place. The impediment here can be performed selectively along the entire transport path, in particular in the infeed section, and be achieved by a frictional resistance acting on the closure cap, for example. It is prevented by virtue of the impediment that any potential rotating movement of the closure cap exceeds the rotating movement of the driver. It can be ensured in this way that the engagement between the driver and the detent is enforced when feeding. Alternatively, a rotating speed of the driver can be chosen in such a manner that said rotating speed in any conceivable case is higher than a potential spontaneous or previously introduced rotation of the closure cap so that the rotation of the latter does not have to be impeded.

Depending on the requirement, a potential rotating movement can be completely decelerated by the frictional resistance. Without a rotating movement of the closure cap about the central axis thereof, a full rotation of the driver is at most required in order to bring the latter to reliably engage with the detent of the closure cap when feeding. The frictional resistance can be selectively applied, for example by way of a surface characteristic of a transport support surface for the closure cap, and if required be reinforced in a targeted manner, for example by way of a vacuum applied to a perforated sliding face of the transport support surface. The impediment can also be performed by way of a separate brake apparatus, for example in the sense of a brake shoe, which interacts with the closure cap.

When the closure cap is acquired by the transport installation, a relative movement of the rotating driver and of the closure cap in the direction of the central axis preferably takes place. To this end, a support mandrel on which the driver can be disposed can engage in the axial direction in the interior of the closure cap, for example, and thus acquire the closure cap in order for the latter to be transported. In another embodiment, the closure cap can be introduced in the axial direction into a receptacle of a chuck that is movable along the transport path.

In order to ensure that the rotating driver and the detent of the closure cap do not obstruct the acquisition of the closure cap in the axial relative movement of the rotating driver and the closure cap in the direction of the central axis thereof, the driver and the detent preferably have a profile that diverges in a direction parallel to the central axis. The elements are in particular designed in such a manner that the detent by virtue of the diverging profiles can slide on the driver, or vice versa, when said detent and said driver are disposed on top of one another in the direction of the central axis when the closure cap is being acquired by the transport installation.

The rotating driver when acquiring the closure cap is preferably at least partially introduced into an interior of the closure cap. In this way, the detent of the closure cap can be configured on an internal side of the closure cap, this being particularly advantageous because an external shape of the closure cap with which a later user is confronted is not disturbed by the detent.

In one preferred embodiment, the driver is disposed on a support mandrel of the transport installation, said support mandrel having at least one, in particular largely circular-cylindrical, support region which for supporting the shell of the closure cap is rotatable about a rotation axis oriented in particular so as to be perpendicular to the cutting section, wherein the shell of the closure cap while rolling across the support region is supported from an internal side. The support region in the cutting section preferably lies opposite the cutting blade and offers up the shell to the cutting blade.

The support region here can be mounted so as to be rotatable in relation to the remaining part of the support mandrel, or be fixedly connected to the support mandrel, wherein the entire support mandrel is rotatably mounted in the latter case. The support region or the support mandrel can preferably be set in a controlled rotating movement by way of a drive. The rotating driver can be fixedly disposed on the support region or fixedly disposed on the rotating support mandrel such that the driver is rotatable conjointly with the support region or conjointly with the entire support mandrel. In an embodiment which is preferable depending on the requirement, the rotating driver is disposed on the support mandrel so as to be rotatable independently of the support mandrel or the support region, respectively, and is rotatably mounted on the support mandrel, for example. The rotation axis of the driver is preferably disposed so as to be concentric with a longitudinal axis of the support mandrel.

The driver is preferably disposed on an axial end side of the support mandrel, and the detent is preferably disposed on an internal side of the base of the closure cap. In this way, the closure cap can be acquired in a simple manner by the support mandrel of the transport installation, on the one hand. On the other hand, a reliable engagement can be ensured in a simple manner as a result of the axial disposal of the driver on the end side of the support mandrel and the configuration of the detent on the internal side of the base, without the external shape or an internal thread of the closure cap being disturbed by the detent, for example. The shell can be offered up to the cutting blade in a controlled and reliable manner in that the support mandrel has a support region which supports the shell from an internal side while said shell rolls on the cutting blade. The support region here preferably supports the shell in a momentary cutting region in which the cutting blade penetrates the shell, the cutting geometry thus being able to be reliably introduced into the shell.

In one preferred embodiment, the rotation axis of the rotating driver is guided in the machining section, in particular in the cutting section, so as to be parallel and eccentric in relation to the central axis of the closure cap. This is particularly advantageous in an embodiment in which a support mandrel on which the driver is disposed is present. It can be achieved as a result of the eccentric guiding that a support region of the support mandrel that has a smaller diameter than an internal diameter of the closure cap can bear on the shell of the closure cap from the inside. The support region can thus guide the shell in particular from the inside toward the cutting blade while said shell is rolling in a momentary cutting region.

The eccentric guiding can be achieved in that a movement path of the rotation axis of the driver along the transport path is guided in the lateral direction toward the cutting blade and/or in that a guide means, in particular a contact face, in the region of the cutting section is present in such a manner that said contact face by way of the central axis thereof is offset so as to be parallel in relation to the rotation axis of the driver. In other words, the eccentric guiding can be achieved in that either the central axis of the closure cap is offset in relation to the rotation axis of the driver, or the rotation axis of the driver is offset in relation to the central axis of the closure cap.

As opposed thereto, the rotation axis of the rotating driver in terms of the central axis of the closure cap during feeding is preferably guided so as to be parallel and largely concentric, in particular so as to be less eccentric than in the machining section. This is particularly advantageous in an embodiment in which a support mandrel on which the driver is disposed is present. The engagement of the driver and the detent during feeding can be simplified by virtue of the largely concentric disposal. In particular, the support mandrel can be introduced into the closure cap in a largely concentric manner, and the driver disposed on said support mandrel can be brought to engage with the detent of the closure cap in a simple manner by a rotating movement. In the case of a largely concentric disposal, the closure cap and the driver rotate at substantially identical, largely constant angular velocities once the engagement has taken place, this potentially simplifying the oriented feeding according to the invention of the closure cap to the machining region.

Alternatively, the relative disposal of the rotation axis of the driver and of the central axis of the closure cap can already be eccentrically disposed during feeding, wherein in this case the closure cap by virtue of the eccentric relative disposal rotates at a non-uniform angular velocity while the angular velocity of the driver is constant.

In one preferred embodiment, the machining section comprises an approach section which in the direction of the process is disposed ahead of the cutting section and extends in particular from the beginning of the machining section up to the beginning of the cutting section, wherein a rotation of the closure cap about the central axis thereof is unequivocally controlled in the approach section. The rotation of the closure cap, at least in the approach section, preferably in the entire machining section, is preferably controlled so as to be largely independent of the rotating driver.

To this end, control means such as, for example, a contact face, by way of which a rotation of the closure cap about the central axis thereof in the approach section is able to be controlled, can be present, such that an orientation of the rotary position of the closure cap when entering the cutting section, proceeding from the orientation of said closure cap when entering the machining section, is unequivocally determined. The shell of the closure cap in the approach section here is preferably positively rolled on a contact face such that an orientation of the rotary position of the closure cap in terms of the central axis thereof when entering the cutting section is unequivocally determined by the length of the approach section.

In an embodiment which is potentially likewise preferable, depending on the embodiment, there is no approach section and the machining section corresponds to the cutting section, as a result of which the entry to the machining section corresponds to a first contact point of the shell of the closure cap and the cutting blade. The rotating movement of the closure cap in this case is predefined by the rolling during the cutting procedure but may be controlled by additional control means such as a contact face.

The invention also comprises an apparatus for producing the cutting geometry running in the circumferential direction, in particular for producing a locking ring, in the shell of the closure cap for a container. The apparatus is particularly suitable for carrying out the method according to the invention. To this end, the apparatus comprises a transport installation for transporting the closure cap along a transport path which comprises a machining section, wherein a stationary cutting knife having a cutting blade which for generating the cutting geometry in the shell of the closure cap extends along a cutting section is present in the machining section. The apparatus is distinguished in that the transport installation comprises a driver which rotates about a rotation axis and is able to be brought to engage with a detent configured on the closure cap and is controllable in such a manner that, when the closure cap enters the machining section, the rotating driver has a rotary position corresponding to a predefinable orientation of the closure cap about the central axis thereof.

The rotating driver as well as the detent of the closure cap are preferably configured in such a manner that said driver and said detent can be brought to engage in each rotary position, even in the case of an eccentric disposal of the rotation axis and the central axis. To this end, the driver and the detent in the radial direction in terms of the rotation axis, or of the central axis, respectively, can have in each case an extent of such a type that the volumes of the driver and the detent swept in a complete revolution about the respective axis have an overlap in the entire angular range of the revolution.

The apparatus along the transport path, ahead of the machining section and adjoining the latter, advantageously has an infeed section for transporting the closure cap during feeding. Depending on the requirement, the infeed section can comprise a contact face for rolling an external side of the shell of the closure cap such that the latter is able to be set in a controlled rotation about the central axis thereof. This rotation can be largely independent of the rotating movement of the rotating driver.

The apparatus according to the invention preferably comprises a control apparatus which is designed and configured for controlling a rotating movement of the rotating driver along the transport path. To the extent that the driver is fixedly disposed on a rotating support mandrel, or a rotating support region of the support mandrel, respectively, the control apparatus is in particular designed and configured for controlling a rotating movement of the support mandrel. The control apparatus is advantageously designed and configured for controlling a rotating movement of the rotating driver as well as an advancing movement of the transport installation by way of which the closure cap is conveyed along the transport path. To this end, the control apparatus can provide a mechanical or an electronic coupling between the advancing movement and the rotating movement, for example.

The mechanical coupling can be achieved, for example, in that an axle of a rotatable mounting of the rotating driver is mechanically coupled to the advancing movement of the transport installation by way of a gearbox. The coupling here can be variable such that different ratios between the advancing movement and the rotating movement can be set in the course of passing through the transport path, depending on the portion and the requirement. The gearbox here can comprise components that interact in a form-fitting and/or force-fitting manner such as, for example, gear wheels, friction rollers, annular internal toothings or traction means drives such as, for example, V-belts/timing belts or chains, etc. The gearbox is typically designed in such a manner that there is a positive coupling between the rotating movement of the driver and the advancing action of the transport installation. The gearbox can also have a coupling apparatus by way of which the rotating movement and the advancing movement can be decoupled when required, for example for servicing.

The electronic coupling can be achieved by way of an electronic controller, for example, which by way of separate electric drives controls the advancing movement of the transport installation and the rotating movement of the driver, for example. To this end, a first electric motor can be present for driving an axle of the rotating driver, or optionally of a support mandrel or of a chuck on which the driver is disposed, respectively, as well as a second electric motor for the advancing movement of the transport installation along the transport path. For example, servomotors, stepper motors or linear motors, or combinations thereof, by way of which the desired movements can be achieved, can be used as electric motors.

Depending on the requirement, the apparatus can moreover also have one or a plurality of sensors which is/are connected to the control apparatus and by way of which a rotary position of the axle of the support mandrel and/or a position of the transport installation can be monitored or measured, for example. The corresponding measurements can be evaluated by the control apparatus, as a result of which a continual adjustment of the movements provided by the transport installation can take place. It is understood that the control apparatus can be configured as an open-loop or closed-loop control.

In one preferred embodiment, the control apparatus is designed and configured for controlling the rotating movement of the rotating driver in such a manner that a rotating speed during feeding corresponds to a rotating speed in the region of the machining section.

In an embodiment which is optionally likewise preferred, depending on the requirement, the control apparatus is designed and configured for controlling the rotating movement of the rotating driver in such a manner that a first rotating speed during feeding is higher than a second rotating speed in the region of the machining section. This has the advantage that it can be ensured during feeding that the driver by virtue of the higher rotating speed can come to reliably engage with the detent, while it can be ensured in the region of the machining section that the engagement can be released by virtue of the lower rotating speed.

The control apparatus is preferably designed and configured for controlling the rotating movement of the rotating driver and/or of the closure cap in the machining section in such a manner that an angular velocity of the rotating driver about the rotation axis thereof differs from an angular velocity of the closure cap about the central axis of the latter in particular by at most 10%. Here, the angular velocity of the rotating driver is in particular lower than the angular velocity of the closure cap. The engagement between the rotating driver and the detent of the closure cap can be released as a result of the lower angular velocity of the driver. As a result of the upper limit it can be prevented, in particular during the cutting procedure, that the faster rotating detent of the closure cap is offered up to the slower rotating driver, i.e. catches up or overtakes the latter, respectively. The cutting procedure typically does not require more than 1 to 2 complete revolutions of the closure cap such that a collision with the driver can be prevented in a sufficiently reliable manner by way of the stated upper limit of at most 10%. In particular in the case of a rotating support mandrel, a circumferential speed on the circumference of a conjointly rotating support region, by virtue of the dissimilar angular velocities, is lower than a rolling speed of the shell. The rolling speed of the shell thus likewise differs from the circumferential speed of the support region by at most 10%. Therefore, slippage between the support region and the internal side of the shell on which the support region rolls can arise in this case.

In one preferred embodiment, the apparatus in the machining section at least in portions comprises a contact face as a control means for an external side of the shell of the closure cap, the closure cap being able to roll, in particular without slippage, on said contact face. As a result of rolling on the contact face, the closure cap performs a rotation about the central axis thereof, said rotation preferably being largely independent of a rotation of the driver of the transport installation. This rotation is preferably completely determined by the contact face and the advancing movement of the transport installation. The contact face advantageously has a surface structure which interacts with an external side of the shell in such a manner that slippage is prevented. To this end, the contact face can have a surface structure which is suitable to this end and which increases a friction in relation to the shell or in which complementary surface structures of the shell can engage, for example. The contact face particularly advantageously has a toothing with notches which run perpendicularly to the machining section and which by way of a knurling, in particular a fluting, of the shell interact in the manner of gear wheels or racks, respectively, with notches of the closure cap that run along the rotation axis. The contact face can extend only in regions or across the entire machining section.

The contact face is preferably disposed in the direction perpendicular to the rotation axis of the driver in such a manner that, by virtue of rolling on the contact face, the closure cap by way of the central axis thereof is offset parallel in relation to the rotation axis of the driver, or optionally to the rotation axis of a support mandrel or of a support region of the support mandrel on which the driver is disposed. In other words, a lateral spacing of the contact face from the movement path of the rotation axis of the driver is preferably smaller than an external radius of the closure cap.

In one preferred embodiment, the machining section comprises an approach section which in the direction of the process is disposed ahead of the cutting section and extends from the beginning of the machining section up to the beginning of the cutting section. Means by way of which a rotation of the closure cap about the central axis thereof in the approach section is able to be positively controlled are advantageously present such that an orientation of the rotary position of the closure cap when entering the cutting section, proceeding from the orientation when entering the machining section, is unequivocally determined. A means of this type can be provided by the above-mentioned contact face in the machining section on which the closure cap rolls without slippage, for example. A lateral position of the closure cap, i.e. a position perpendicular to the central axis in relation to the rotation axis of the rotating driver, can be adapted in the approach section, for example.

In an embodiment which is possibly likewise preferable, depending on the requirement, the cutting blade of the cutting knife extends across the entire machining section, and the cutting section corresponds to the machining section. The entry into the machining section in this case corresponds to a first contact point of the shell of the closure cap and the cutting blade.

The rotating driver is preferably disposed on a support mandrel of the transport installation which has at least one, in particularly largely circular-cylindrical, support region which for supporting the shell of the closure cap is rotatable about a rotation axis that is in particular oriented so as to be perpendicular to the cutting section. The support region in terms of the remaining part of the support mandrel here can be rotatably mounted or fixedly connected to the support mandrel, wherein the entire support mandrel in this case is rotatably mounted. The rotating driver here can be fixedly disposed on the support region or fixedly disposed on the rotating support mandrel such that the driver is rotatable conjointly with the support region or with the entire support region. Alternatively however, the rotating driver can also be disposed on the support mandrel so as to be rotatable independently of the support mandrel or the support region, respectively, and be rotatably mounted on said support mandrel, for example. The rotation axis of the driver is preferably disposed so as to be concentric with a longitudinal axis of the support mandrel.

The support region is disposed in such a manner that said support region can support the shell of the closure cap, in particular while rolling on the cutting blade from an internal side, and offer up said shell to the cutting blade, wherein said support region lies opposite the cutting blade during the cutting procedure. The support region here supports the shell in particular in a momentary cutting region in which the cutting blade penetrates the shell. The support region advantageously rolls on the internal side of the shell. To this end, the support region, or the entire support mandrel, respectively, is preferably rotatable in a driven manner. In principle however, it is not precluded that the support region may also be configured so as to be rotatable without being driven. In the latter case, the rotating driver is rotatable independently of the support region.

The rotating driver is particularly advantageously disposed on an axial end side of the support mandrel. The rotating driver can thus be brought to engage with a detent configured on an internal side of the base of the closure cap in a particularly simple manner.

In one preferred embodiment, the transport installation is configured as a rotary table, wherein a plurality of rotating drivers, in particular a plurality of support mandrels, on each of which one driver is disposed, are disposed along a circumference of the rotary table, and wherein the machining section, in particular the cutting section, and preferably optionally also the infeed section, extends/extend along the circumference of the rotary table.

The rotary table per se, or as a separate, for example stationary, part can comprise a support or guide for the closure cap, said support or guide supporting or guiding, respectively, the latter along the transport path. A support face here is disposed at least in the region of the machining section, in particular of the cutting section, preferably so as to be parallel to the transport plane.

A rotation axis of the rotary table is preferably disposed so as to be parallel to the rotation axes of the drivers, and optionally of the support mandrels, respectively, wherein the drivers or support mandrels, respectively, are moved past the cutting knife when the rotary table rotates. The rotary table can have two support structures which are disposed so as to be mutually spaced apart in a largely parallel manner and perpendicular to the rotation axis, for example, on which axles of the driver, or of the support mandrels, respectively, can be directly or indirectly mounted in a rotatable manner. However, the rotary table can also be configured in such a manner that the axles of the drivers and optionally of the support mandrels are only unilaterally mounted on the rotary table.

However, it is understood that a rotary table does not have to be present and the transport path can also be linear, i.e. the transport apparatus can be configured in such a manner that the latter transports the closure cap on a rectilinear path.

Further advantageous embodiments and combinations of features of the invention are derived from the detailed description hereunder and the entirety of the patent claims.

BRIEF DESCRIPTION OF THE DRAWINGS

In the schematic drawings used for explaining the exemplary embodiment.

In principle, identical parts are provided with the same reference signs in the figures.

EMBODIMENTS OF THE INVENTION

Figure 1:
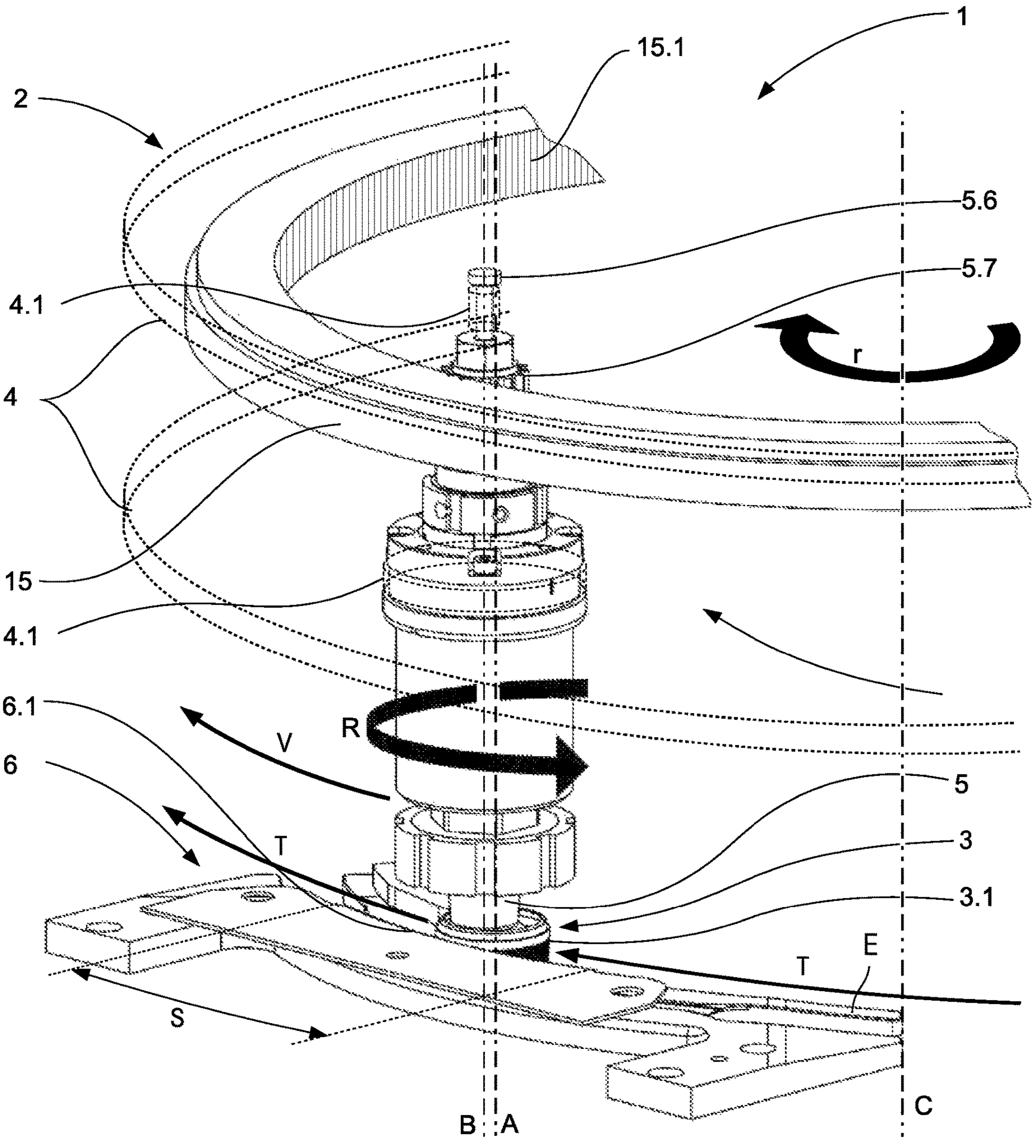
FIG. 1 shows an apparatus according to the invention having a transport installation which transports a closure cap along a cutting section.

FIG. 1 shows a schematic view of an apparatus 1 according to the invention having a transport installation 2 which transports a closure cap 3 along a cutting section S. FIG. 1 shows only specific elements of the apparatus 1, wherein further elements have been omitted for the sake of improved clarity.

The transport installation 2 comprises a rotary table 4 (illustrated with dashed lines) and a support mandrel 5. The support mandrel 5 is mounted on the rotary table 4 so as to be rotatable about the longitudinal axis B of said support mandrel 5. The rotary table 4 is only schematically indicated and can have one or a plurality of support structures on which the support mandrel 5 is mounted on one or a plurality of counter bearings 4.1 so as to be rotatable about the rotation axis B in relation to the rotary table 4. The support mandrel 5 can however also have, for example, a housing in which the rotatable mounting is configured and which is fixedly anchored to the rotatory table 4.

The rotary table 4 is mounted on a stationary mounting structure (not shown) of the apparatus 1 so as to be rotatable about a rotation axis C. A rotating movement r of the rotary table 4 about the rotation axis C defines an advancing movement V of the support mandrel 5 of the transport installation 2 along the transport path T. In the embodiment of the apparatus 1 having the rotary table 4, the transport path T is in the shape of an arcuate segment. It is understood that a plurality of support mandrels 5 can be rotatably mounted along the circumference on the rotary table 4, said plurality of support mandrels 5 being simultaneously moved along the transport path T and successively passing a machining section W having a cutting section S.

A gear wheel 5.7 which is coaxial with the rotation axis B is fixedly disposed on an axle body 5.6 of the support mandrel 5, said axle body being disposed so as to be coaxial with the rotation axis B. The gear wheel 5.7 rolls on an internal toothing 15.1 of a ring 15, the latter being stationary in relation to the rotary table 4. Controlling the rotating movement R of the support mandrel 5 by the advancing action V provided by the rotating movement r of the rotary table 4 is thus achieved in a simple manner. The rotating movements R and r here have opposite rotating directions. In a suitable configuration of the toothing, the control can be chosen in such a manner that, when the closure cap 3 enters the cutting section S, the support mandrel 5, in particular a driver 8 configured thereon (see below), has a predefinable orientation. The toothings of the gear wheel 5.7 and the internal toothing 15.1 of the ring 15 are chosen such that the same orientation of the driver 8 is re-established after a complete revolution of the rotary table. The gear wheel 5.7 conjointly with the ring 15 thus form parts of a control apparatus of the apparatus 1 that is simple to configure. In the case of a plurality of support mandrels 5, the gear wheels 5.7 of all support mandrels 5 can roll on the same ring 15 such that the latter couples the rotating movements R of the support mandrels 5 about the respective rotation axes B. Potential drives which drive the rotary table 4 are not illustrated.

In the illustration of FIG. 1, the support mandrel 5 is situated in the region of the cutting section S, the latter forming a portion of the transport path T. The support mandrel 5 by way of a support region 5.1 engages in an interior of the closure cap 3 and transports the latter along the cutting section S. A cutting knife 6 having a cutting blade 6.1 is disposed in the cutting section S. The cutting blade 6.1 is configured so as to be curved in order to adapt to the transport path T and at least partially protrudes into the transport path T of the closure cap 3. In the course of being transported along the cutting section S, the closure cap 3 by way of a shell 3.1 is rolled on the cutting blade 6.1 in such a manner that the cutting blade 6.1 generates a cut in the shell 3.1. The support region 5.1 supports the shell 3.1 of the closure cap 3 from the inside and guides said shell 3.1 toward the cutting blade 6.1. The rotation axis B of the support mandrel 5, in terms of a central axis A of the closure cap 3, is guided so as to be offset in the direction perpendicular to the cutting section S. A support surface on which the closure caps 3 slide defines a transport plane E. The rotation axis B and the central axis A are perpendicular to the transport plane E.

FIGS. 2 to 11 show a sequence of a method according to the invention, first in lateral views having partially sectional views (FIGS. 2 to 4), and subsequently in a cross section perpendicular to the central axis A of the closure cap 3 (FIGS. 5 to 11). Irrelevant features of the support mandrel 5 have been omitted for the sake of improved clarity in FIGS. 5 to 11.

Figure 2:
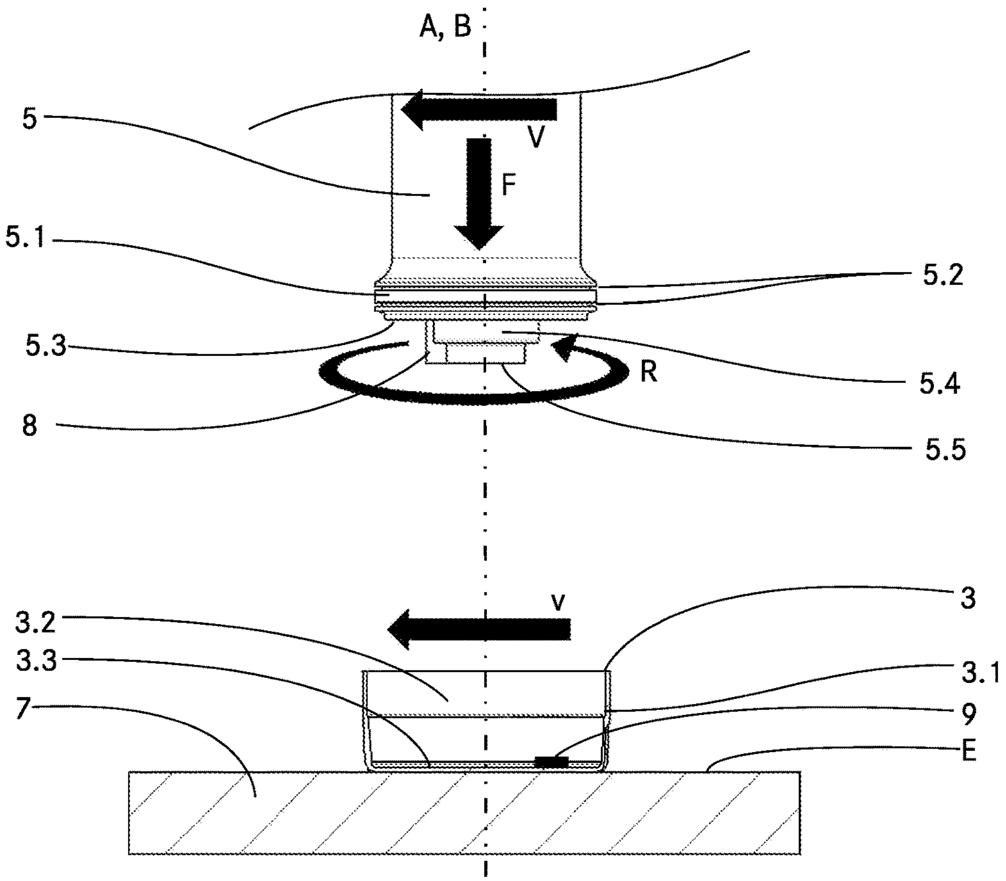
FIG. 2 shows a lateral view of a support mandrel of the transport installation prior to acquiring the closure cap.

FIG. 2 shows a schematic lateral view of the support mandrel 5 of the transport installation 2 prior to acquiring the closure cap 3. The support mandrel 5 is moved in an advancing movement V and by way of a rotating movement R rotates about the longitudinal axis B of said support mandrel 5. In the case illustrated, the closure cap 3 is provided with an advancing movement v which is harmonized with the advancing movement V of the support mandrel 5. In this way, the transport installation 2 does not have to be decelerated for acquiring the closure cap 3, this being advantageous with a view to time-saving and efficient processing. The closure cap 3 is provided in such a manner that the longitudinal axis B of the support mandrel 5, the former also corresponding to the rotation axis B of the latter, is disposed so as to be largely coaxial with the central axis A of the closure cap 3.

The closure cap 3 here slides on a transport support surface 7 which presently also defines the transport plane E. The longitudinal axis B of the support mandrel 5 is perpendicular to the transport support surface 7, or to the transport plane E, respectively. Further guide means which may be present, for example receptacles that are moved conjointly with the rotary table, and which guide the closure cap 3 in the direction of the advancing movement v are not illustrated.

The support region 5.1 of the support mandrel 5 is formed by a shell face of the support mandrel 5 that is configured so as to be largely circular-cylindrical. In the present case, the support region 5.1 has two completely or partially encircling grooves 5.2 which are provided for engagement by way of the cutting blade 6.1 of the cutting knife 6, or by way of a further, not illustrated cutting blade of the cutting knife 6, respectively, during the cutting procedure.

The support mandrel 5, on an end side 5.3 in an end region that in the direction of the longitudinal axis B faces the closure cap 3, has a neck 5.4 on which a driver 8 is configured. The neck 5.4 can be resiliently mounted. The driver 8, proceeding from the neck 5.4, extends outward in a direction perpendicular to the longitudinal axis B (cf. FIGS. 5 to 11 to this end). In the longitudinal direction B, the driver 8 ends by way of an end side 5.5 of the neck 5.4. The end side 5.5 designates an outermost end of the support mandrel 5.

A detent 9 is configured on an inner base 3.3 of the closure cap 3. The detent 9 is configured as a simple cam and extends eccentrically in the radial direction in terms of the central axis A of the closure cap 3. In particular, the detent 9 extends eccentrically in such a manner that in the case of a substantially concentric disposal of the support mandrel 5 and the closure cap 3, the support mandrel 5 by way of the end face 5.5 of the neck 5.4 can be lowered onto the internal base 3.3 without being obstructed by the detent 9, on the one hand. On the other hand, the detent 9 is disposed in such a manner that the driver 8 can acquire said detent 9 in the case of a relative rotation of the support mandrel 5 and of the closure cap 3 about the central axis A, or the longitudinal axis B, respectively.

In the illustration of FIG. 2, the support mandrel 5 is situated in a lowering movement F in the longitudinal direction B toward the closure cap 3 so as to acquire the latter by introducing the end region of the support mandrel 5 into an interior 3.2 of the closure cap 3. (Alternatively, the closure cap 3 can of course also be guided upward toward the support mandrel 5, or both elements are converged).

Figure 3:
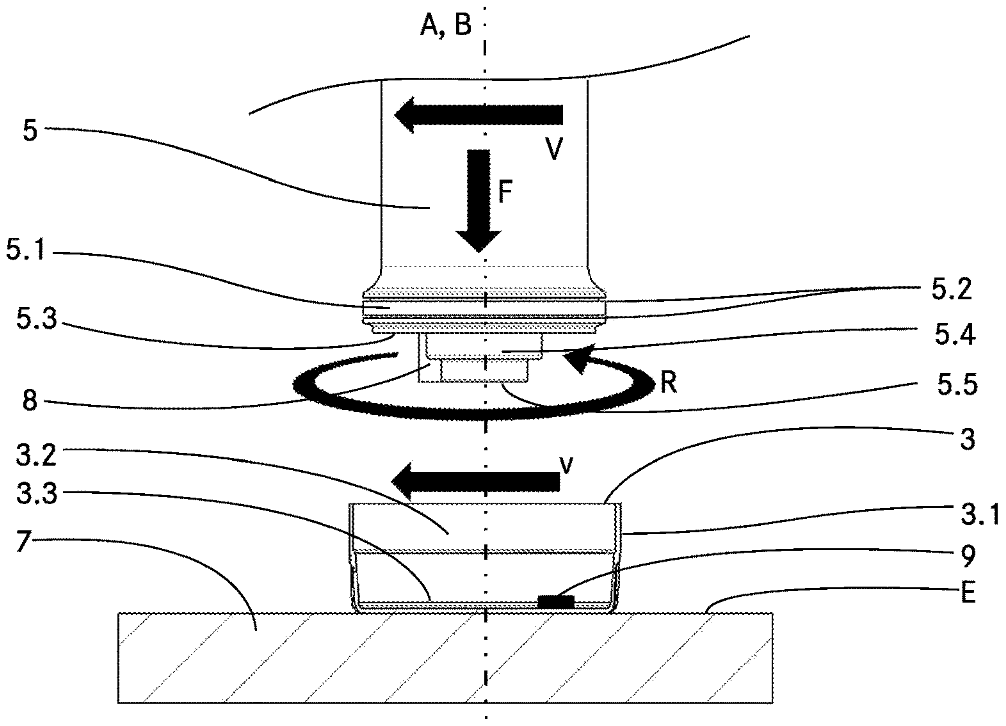
FIG. 3 shows a lateral view of the support mandrel of the transport installation just prior to acquiring the closure cap.

FIG. 3 shows a schematic lateral view of the support mandrel 5 of the transport installation 2 just prior to acquiring the closure cap 3. The illustration of FIG. 3 relates to a somewhat later position of the method than the illustration of FIG. 2, in which the support mandrel 5 has been lowered further in the direction F toward the closure cap 3 and is just prior to being introduced into the interior 3.2 of the closure cap 3.

Figure 4:
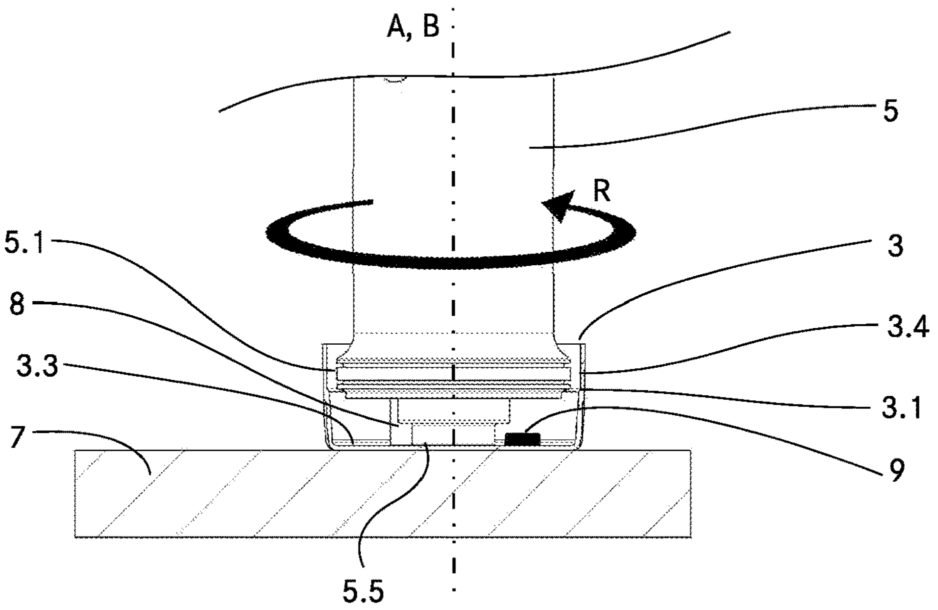
FIG. 4 shows a lateral view of the support mandrel of the transport installation when acquiring the closure cap.

FIG. 4 shows a schematic lateral view of the support mandrel 5 of the transport installation 2 when acquiring the closure cap 3. The support mandrel 5 by way of the end side 5.5 of the neck 5.4 has been completely lowered onto the internal base 3.3 of the closure cap 3. The driver 8 as well as the detent 9 in this position are disposed in a plane which is parallel to the transport plane E but have not yet been brought to engage. The closure cap 3 is now situated on an infeed section Z of the transport path T, running along the track 10.

The support region 5.1 of the support mandrel 5 in this position is disposed radially within a shell region 3.4 of the shell 3.1 of the closure cap 3, in which shell region 3.4 the cut, or a cutting geometry, respectively, is to be generated in the further method.

Figure 5:
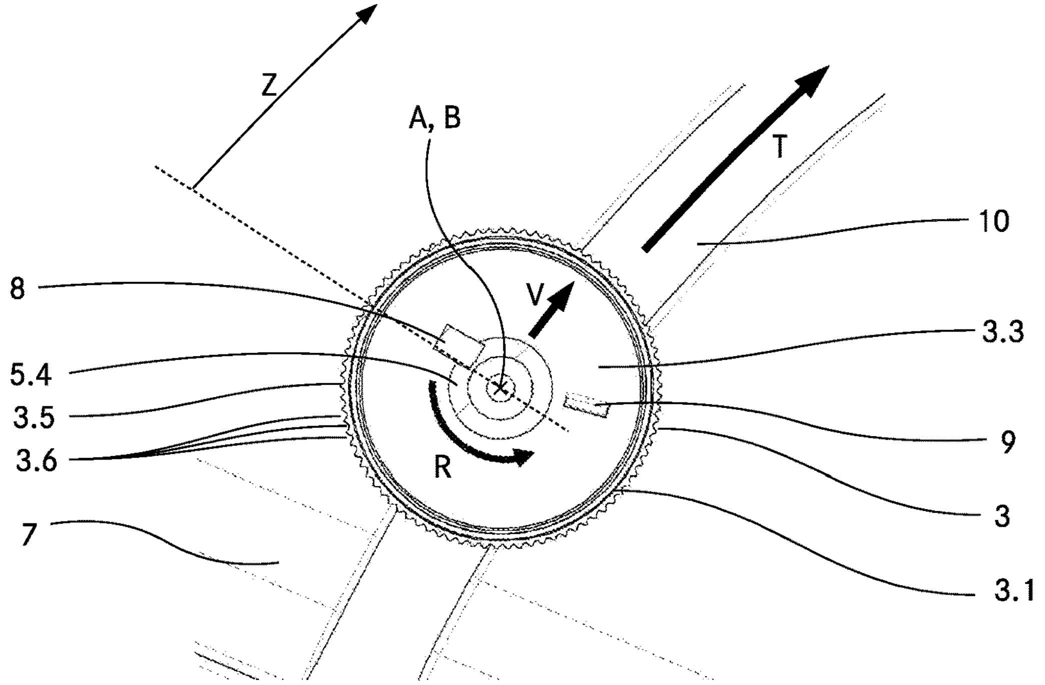
FIG. 5 shows a sectional view in a section plane which lies parallel to a transport plane and runs through a driver and a detent.

FIG. 5 shows a sectional view in a sectional plane which lies parallel to the transport plane E and runs through the driver 8 as well as the detent 9. A line of vision is directed onto the transport support surface 7. The position of the method of FIG. 5 corresponds to the position of the method of FIG. 4, after the closure cap 3 has been acquired by the support mandrel 5 of the transport installation 2. The beginning of the infeed section Z on which the closure cap 3 is fed to a machining section W is indicated with dashed lines. In the present context, a beginning of the infeed section Z can be defined by the acquisition of the closure cap by the support mandrel 5.

It can be seen in the sectional view of FIG. 5 that the shell 3.1 of the closure cap 3, on a shell external side 3.5, has notches 3.6 that run parallel to the central axis A and result in a cross section in the manner of a gear wheel. The notches 3.6 extend across a specific height in the direction A, away from the closure cap 3, and form a knurling or fluting, respectively.

The driver 8 is somewhat inclined in terms of a direction which is radial in relation to B, so as to ensure improved contact of the detent 9 during a later engagement of the driver 8 and the detent 9, the latter being aligned so as to be radial in relation to A.

The support mandrel 5 performs a rotating movement R. The closure cap 3, which is transported by the transport installation 2, initially does not have any defined rotating movement about the central axis A of said closure cap 3. An uncontrolled rotation can result by virtue of the infeed. The driver 8 of the support mandrel 5, by virtue of the rotating movement R, is to come to engage with the detent 9 of the closure cap 3. In order to prevent that the detent 9, by virtue of an initial rotating movement of the closure cap 3, runs faster than the driver 8, which would make reliable contacting impossible, the original rotating movement of the closure cap 3 can be impeded, for example by a friction-fit between the shell external side 3 of the closure cap 3 and resilient elements, for example the cap receptable, and/or by means of a vacuum system on the rotary table.

Figure 6:
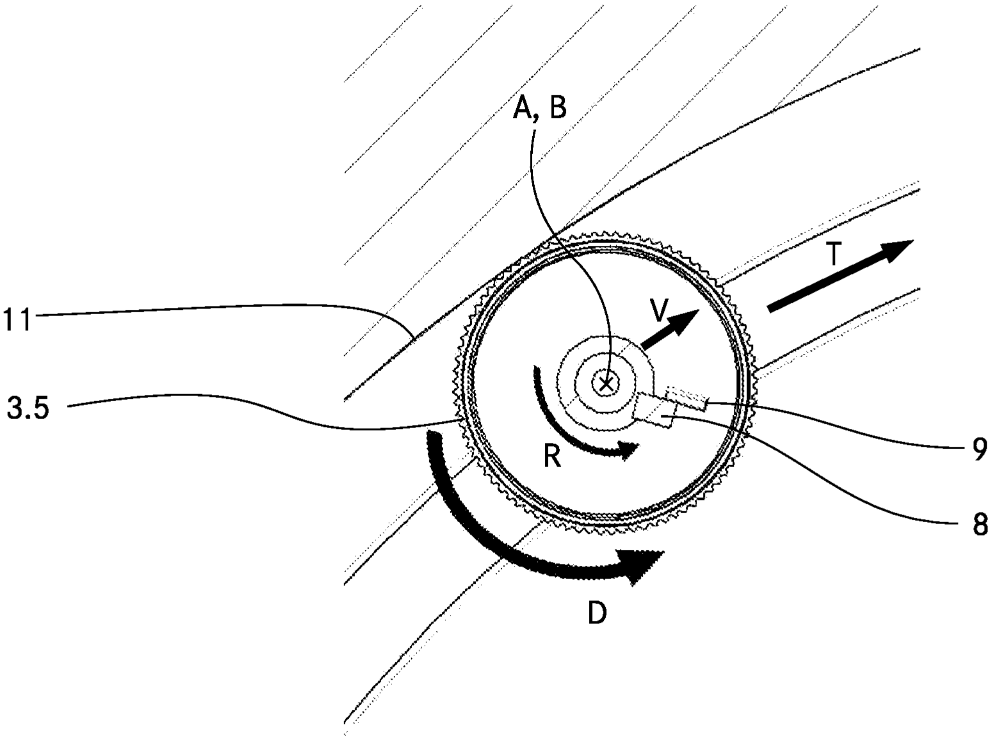
FIG. 6 shows a sectional view analogous to that of FIG. 5 in a later position of the method at which the driver and the detent come to engage.

FIG. 6 shows a sectional view analogous to that of FIG. 5, in a later position of the method in which the driver 8 and the detent 9 have come to engage.

The transport installation 2 has transported the closure cap 3 further along the transport path T along the infeed section Z. In this portion of the infeed section Z, a contact face 11 which guides the closure cap 3 during transport is configured on the external side along the transport path T. The contact face 11 here is disposed in such a manner that the longitudinal axis B of the support mandrel 5 and the central axis A of the closure cap 3 remain so as to be substantially concentrically disposed. The contact face 11 to this end typically has a spacing from the movement path of the longitudinal axis B of the support mandrel 5, said spacing corresponding to half the external diameter of the shell external side 3.5.

By virtue of the engagement between the driver 8 and the detent 9, the closure cap now performs a rotating movement D which corresponds to the rotating movement R of the support mandrel 5. This means that the external shell face 3.5 of the closure cap 3, at a constant advancing movement V, rolls, i.e. also slides, on the contact face 11 with slippage.

Figure 7:
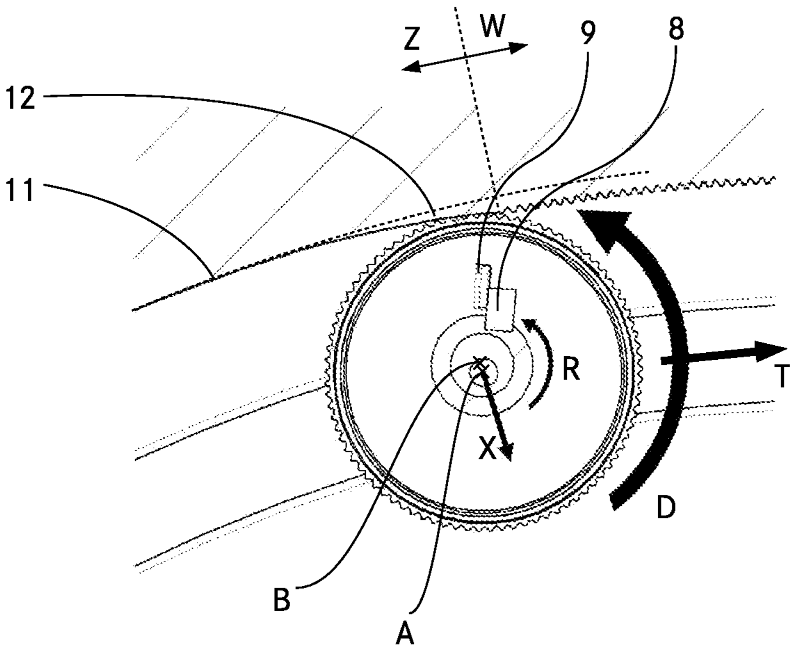
FIG. 7 shows a sectional view analogous to that of FIG. 6 in a later position of the method, just before the closure cap enters a machining section.

FIG. 7 shows a sectional view analogous to that of FIG. 6, in a later position of the method, just before the closure cap 3 enters the machining section W.

The rotation D of the closure cap 3 in this position of the method continues to be determined by the rotating movement R of the support mandrel 5, said rotating movement R being transmitted to the closure cap 3 as a result of the engagement of the driver 8 and the detent 9. The contact face 11 toward the transition to the machining face has a ramp 12 which, proceeding from the previous profile of the contact face 11, is curved toward the transport path T. The ramp 12 guides the closure cap 3 in a direction X which is largely perpendicular to the profile of the transport path T and displaces said closure cap 3 in relation to the movement path of the support mandrel 5. The closure cap 3 here is in particular displaced so far that said closure cap 3, when later entering the machining section W, by way of a shell internal side disposed at the contact face 11 bears on the support region 5.1 of the support mandrel 5 (not shown), and the axis of rotational symmetry A has an offset Y in relation to the longitudinal axis B of the support mandrel 5. The closure cap 3 is thus laterally displaced relative to the support mandrel 5 such that the central axis A of the closure cap 3 is eccentrically disposed in terms of the longitudinal axis B of the support mandrel 5.

The driver 8 and the detent 9 in the radial direction here are sized in such a manner that the engagement is maintained as a result of the eccentric displacement.

Figure 8:
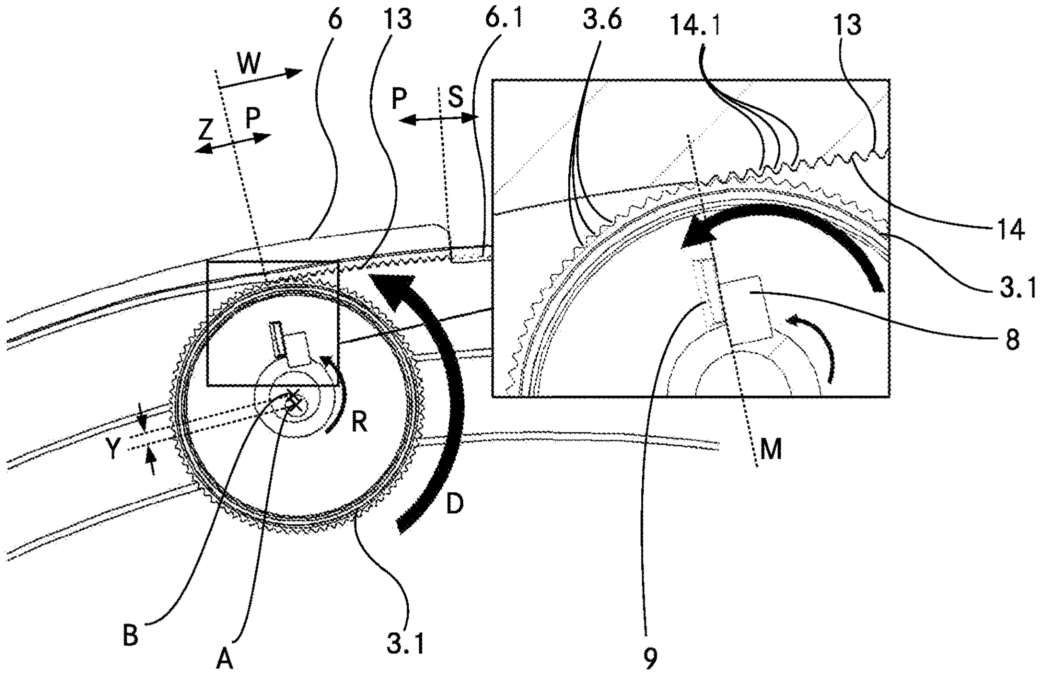
FIG. 8 shows a sectional view analogous to that of FIG. 7 in a later position of the method at which the closure cap enters the machining section.

FIG. 8 shows a sectional view analogous to that of FIG. 7, in a later position of the method at which the closure cap 3 enters the machining section W.

The machining section W has a contact face 13 which is offset in relation to the contact face 11 of the infeed section Z to the transport path T. The ramp 12 of the infeed section Z at the transition to the machining section enables a continuous transition. The axis of rotational symmetry A of the closure cap 3 when entering the machining section W thus has an offset in relation to the longitudinal axis B of the support mandrel 5, said offset corresponding to the displacement caused by the ramp 12. The contact face 13 runs along the transport path T at a constant spacing such that the offset Y is maintained.

The contact face 13 has a toothing 14 with teeth 14.1 which extend so as to be perpendicular to the transport plane E, i.e. parallel to the central axis A of the closure cap 3 as well as parallel to the longitudinal axis B of the support mandrel 5. The toothing 14 is configured in such a manner that the teeth 14.1 can engage in the notches 3.6 of the shell external side 3.5 of the closure cap 3. When entering the machining section W, the teeth 14.1 come to engage with the notches 3.6, the closure cap 3 by way of the shell external side 3.5 thereof thus rolling on the contact face 13. Positive controlling of a rotation D' of the closure cap 3 as a function of the advancing movement V is thus created by virtue of the toothing 14 and in that the shell 3.1 of the closure cap 3 by virtue of the offset Y is guided from the support region 5.1 against the contact face 13. The rotating speed of the rotation D' of the closure cap 3 in the machining section W is higher than the rotating speed of the rotating movement R of the support mandrel 5 (cf. FIG. 9).

When the closure cap 3 enters the machining section W, the support mandrel 5 and thus the driver 8 disposed thereon have a predefined rotary position M. Because the driver 8 and the detent 9 are engaged when entering the machining section W, the closure cap 3 has an orientation of the rotary position thereof that is predefinable by way of the rotary position of the support mandrel 5. A desired rotary position of the closure cap 3 can thus be adjusted by correspondingly controlling the rotating movement of the support mandrel 5. Because the closure cap 3 in the further procedure of the method in the machining section W positively rolls on the contact face 13, a rotary position of the closure cap 3 about the central axis A thereof in the machining section W is unequivocally determined at each position of the method.

The cutting blade 6.1 of the cutting knife 6 is disposed in the cutting section S so as to be after an approach section P in the machining section W, said cutting blade 6.1 in the direction of the transport path T protruding beyond the contact face 13. The approach section P and the cutting section S here form sub-portions of the machining section W.

Figure 9:
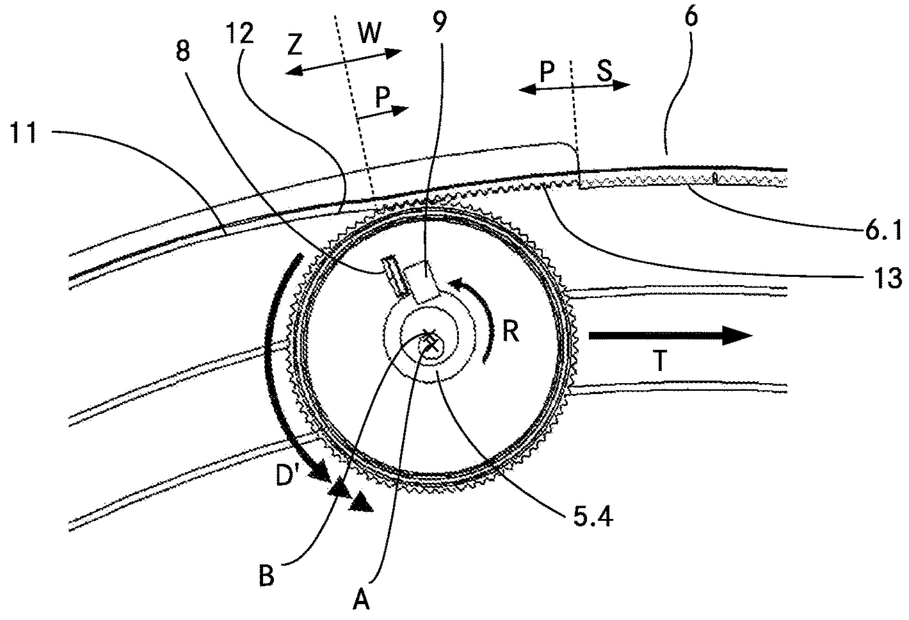
FIG. 9 shows a sectional view analogous to that of FIG. 8 in a later position of the method, just after the closure cap has entered the machining section.

FIG. 9 shows a sectional view analogous to that of FIG. 8, in a later position of the method, just after the closure cap 3 has entered the machining section W.

The rotation D' of the closure cap 3 in the machining section is positively controlled by way of the contact face 13. The rotating speed of the rotation D' of the closure cap 3 in the machining section W is higher than the rotating speed of the rotating movement R of the support mandrel 5 and thus of the driver 8. The detent 9, by virtue of the difference between the rotating speeds, rotates faster about the central axis A of the closure cap 3 than the driver 8 rotates about the rotation axis B. Therefore, the detent 9 is lifted from the driver 8, the engagement of the driver 8 and the detent 9 thus being released.

Figure 10:
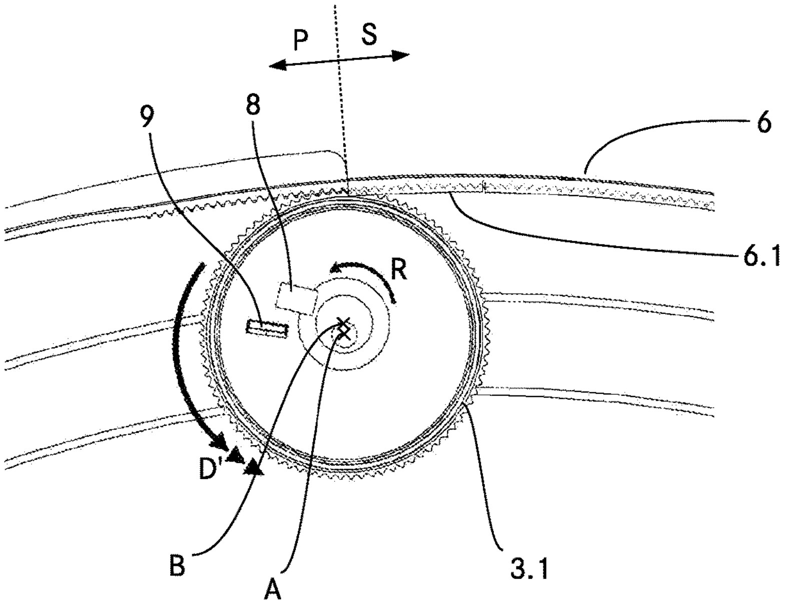
FIG. 10 shows a sectional view analogous to that of FIG. 9 in a later position of the method at which the closure cap enters the cutting section.

FIG. 10 shows a sectional view analogous to that of FIG. 9 in a later position of the method at which the closure cap 3 enters the cutting section S.

The entry of the closure cap 3 into the cutting section S corresponds to a first contact point of the shell 3.1 of the closure cap 3 and the cutting blade 6.1 of the cutting knife 6. Because the cutting blade 6.1 in the direction of the transport path T protrudes beyond the contact face 13, said cutting blade 6.1 can penetrate the shell 3.1 and introduce the cut. The shell 3.1 on the inside here is supported by the support region 5.1 of the support mandrel 5, the latter being disposed opposite the cutting blade 6.1. The cutting blade 6.1 can penetrate the shell 3.1 and protrude into the grooves 5.2 disposed in the support region 5.1.

Because the closure cap 3 in the region of the approach section P positively rolls on the contact face 13, a rotary position of the closure cap 3 about the central axis A thereof when entering the cutting section S is unequivocally determined. The first contact point of the shell 3.1 and the cutting blade 6.1 is thus likewise unequivocally determined, the cut, or the cutting geometry, respectively, thus being able to be introduced into the closure cap 3 in an unequivocally predefinable orientation.

By virtue of the difference between the rotating speeds of the closure cap 3 and the support mandrel 5, the detent 9 having the rotation D' moves further away from the driver 8 which rotates by way of the rotating movement R.

Figure 11:
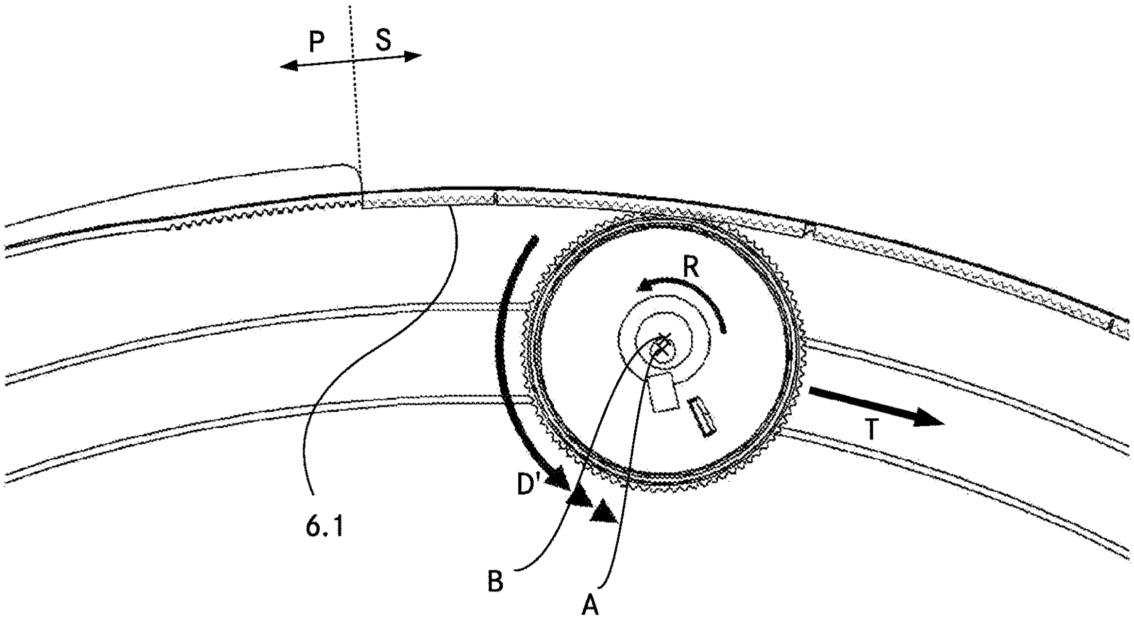
FIG. 11 shows a sectional view analogous to that of FIG. 10 in a later position of the method, during a cutting procedure in the cutting section.

FIG. 11 shows a sectional view analogous to that of FIG. 10 in a later position of the method, during the cutting procedure in the cutting section S.

In the course of the cutting procedure the shell 3.1 of the closure cap 3 rolls on the cutting blade 6.1. The rotation D' of the closure cap 3 about the central axis A thereof in the entire machining section W here is unequivocally determined by the toothing 14 of the contact face 13. In this way, the entire cut can be introduced into the closure cap 3 with great precision and in a predefinable orientation of said closure cap 3.

By virtue of the rotating movements of the closure cap 3 and of the driver 8 about different, mutually offset rotation axes A and B, respectively, the driver 8 in states of rotation can move closer to the detent 9 again. It is therefore recommended that a difference between the rotating speeds of the rotation D' and of the rotating movement R is chosen to be sufficient to preclude any undesirable collision between the driver 8 and the detent 9 in the machining section W.

What is claimed is:

1. A method for producing a cutting geometry running in a circumferential direction in a shell of a closure cap for a container, said method comprising the following steps:

a) providing the closure cap;

b) transporting the closure cap along a transport path by a transport installation; wherein c) the closure cap is fed to a machining section of the transport path, in which machining section a stationary cutting knife having a cutting blade that extends along a cutting section is disposed; and d) a cutting procedure for generating the cutting geometry in the machining section is carried out by rolling the shell on the cutting blade of the stationary cutting knife;

wherein a feeding of the closure cap to the machining section takes place at a predefinable orientation in terms of a rotary position in relation to a central axis of the closure cap in that a driver of the transport installation that rotates about a rotation axis is brought to engage with a detent of the closure cap, and a movement of the rotating driver is controlled to have, when the closure cap enters the machining section, a rotary position that corresponds to the predefinable orientation of the closure cap, wherein a rotation of the closure cap about the central axis thereof in the machining section is controlled to set the closure cap in a predefinable rotation about the central axis thereof, wherein the rotating movement of the rotating driver and/or of the closure cap upon entering the machining section is controlled to provide an angular velocity of the rotating driver about the rotation axis thereof being lower than the angular velocity of the closure cap about the central axis of the latter.

2. The method as claimed in claim 1, wherein the rotating movement of the rotating driver about the rotation axis thereof is controlled to bring the rotating driver and the detent of the closure cap to positively engage within a framework of a complete turn of the closure cap relative to the driver during feeding.

3. The method as claimed in claim 1, wherein the rotating movement of the rotating driver about the rotation axis thereof is controlled that to provide a rotating speed during feeding corresponding to a rotating speed in a region of the machining section, or to provide a first rotating speed during feeding being higher than a second rotating speed in the region of the machining section.

4. The method as claimed in claim 1, wherein a rotation of the closure cap about the central axis thereof in the machining section is controlled to set the closure cap in a predefinable rotation about the central axis thereof, said rotation being largely independent of the rotating movement of the rotating driver.

5. The method as claimed in claim 4, wherein the rotating movement of the rotating driver and/or of the closure cap upon entering the machining section is controlled to provide an angular velocity of the rotating driver about the rotation axis thereof differing from an angular velocity of the closure cap about the central axis of the latter by at most 10%.

6. The method as claimed in claim 1, wherein a rotating movement of the closure cap about the central axis thereof during feeding is impeded.

7. The method as claimed in claim 1, wherein, when the closure cap is acquired by the transport installation, a relative movement of the rotating driver and of the closure cap in a direction of the central axis takes place.

8. The method as claimed in claim 7, wherein the rotating driver is at least partially introduced into an interior of the closure cap.

9. The method as claimed in claim 1, wherein the driver is disposed on a support mandrel of the transport installation, said support mandrel having at least one support region which for supporting the shell of the closure cap is rotatable about a rotation axis and the shell is supported from an internal side during rolling over the support region.

10. The method as claimed in claim 1, wherein the rotation axis of the rotating driver is guided in the machining section so as to be parallel and eccentric in relation to the central axis of the closure cap.

11. An apparatus for producing a cutting geometry running in the circumferential direction in a shell of a closure cap for a container, said apparatus comprising:

a) a transport installation for transporting the closure cap along a transport path which comprises a machining section;

b) a stationary cutting knife having a cutting blade which for generating the cutting geometry in the shell of the closure cap extends along a cutting section is present in the machining section, wherein the transport installation comprises a driver which rotates about a rotation axis and is able to be brought to engage with a detent configured on the closure cap and is controllable to have, when the closure cap enters the machining section, a rotary position corresponding to a predefinable orientation of the closure cap about a central axis thereof, c) a control apparatus designed and configured for controlling the rotating movement of the rotating driver and/or of the closure cap in the machining section to provide an angular velocity of the rotating driver about the rotation axis thereof is being lower than the angular velocity of the closure cap.

12. The apparatus as claimed in claim 11, wherein the control apparatus is designed and configured for controlling a rotating movement of the rotating driver along the transport path.

13. The apparatus as claimed in claim 11, wherein the control apparatus is designed and configured for controlling the rotating movement of the rotating driver to provide a rotating speed during feeding corresponding to a rotating speed in a region of the machining section, or to provide a first rotating speed during feeding being higher than a second rotating speed in the region of the machining section.

14. The apparatus as claimed in claim 11, wherein the control apparatus is designed and configured for controlling the rotating movement of the rotating driver and/or of the closure cap in the machining section to provide an angular velocity of the rotating driver about the rotation axis thereof differing from an angular velocity of the closure cap about the central axis of the latter by at most 20%.

15. The apparatus as claimed in claim 11, wherein a contact face as a control means for an external side of the shell of the closure cap is present in at least portions of the machining section, the closure cap being able to be rolled on said contact face.

16. The apparatus as claimed in claim 11, wherein the driver is disposed on a support mandrel of the transport installation, said support mandrel having at least one support region which for supporting the shell of the closure cap is rotatable about a rotation axis.

17. The apparatus as claimed in claim 11, wherein the transport installation is configured as a rotary table, wherein a plurality of rotating drivers, on each of which one driver is disposed, are disposed along a circumference of the rotary table, and in that the machining section extends along the circumference of the rotary table.

18. The method as claimed in claim 1, wherein the rotating movement of the rotating driver about the rotation axis thereof is controlled to bring the rotating driver and the detent of the closure cap to positively engage within a framework of a complete turn between the closure cap and the driver during feeding, and this engagement, while further rotating the rotating driver, is maintained at least until entering the machining section.

19. The method as claimed in claim 4, wherein a rotation of the closure cap about the central axis thereof in the machining section is controlled to set the closure cap in a predefinable rotation about the central axis thereof, said rotation being largely independent of the rotating movement of the rotating driver in that the shell of the closure cap is rolled on a contact face.

20. The method as claimed in claim 1, wherein a rotating movement of the closure cap about the central axis thereof during feeding, prior to the engagement of the driver and the detent, is impeded.

* * * * *